Sept. 4, 1962 W. S. LEWIS ETAL 3,052,832
AUTOMATIC HEADING CONTROL SERVOSYSTEM
Filed Feb. 5, 1960 2 Sheets-Sheet 2
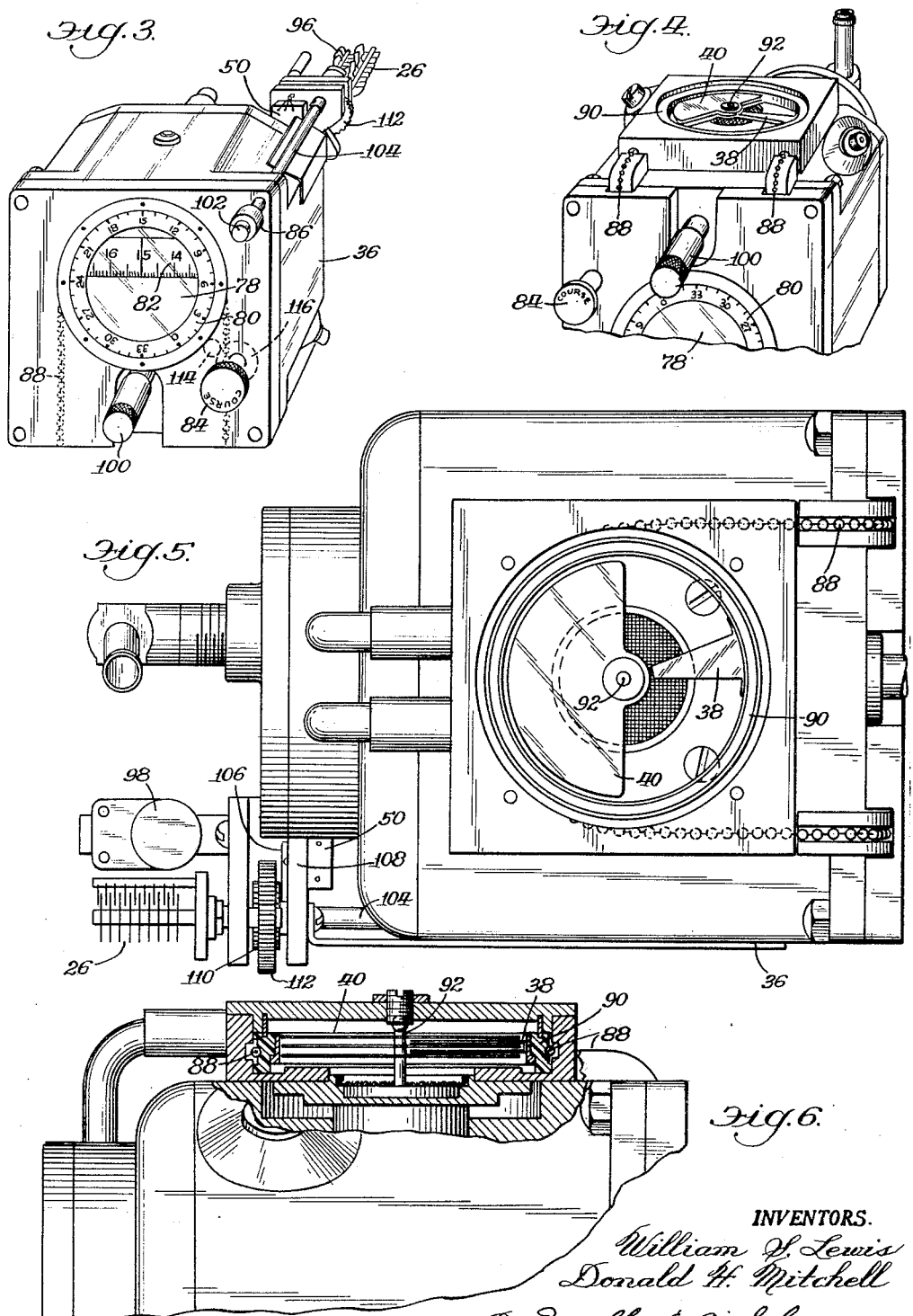
INVENTORS.
William S. Lewis
Donald H. Mitchell
By: Mueller & Aichele
Attys.

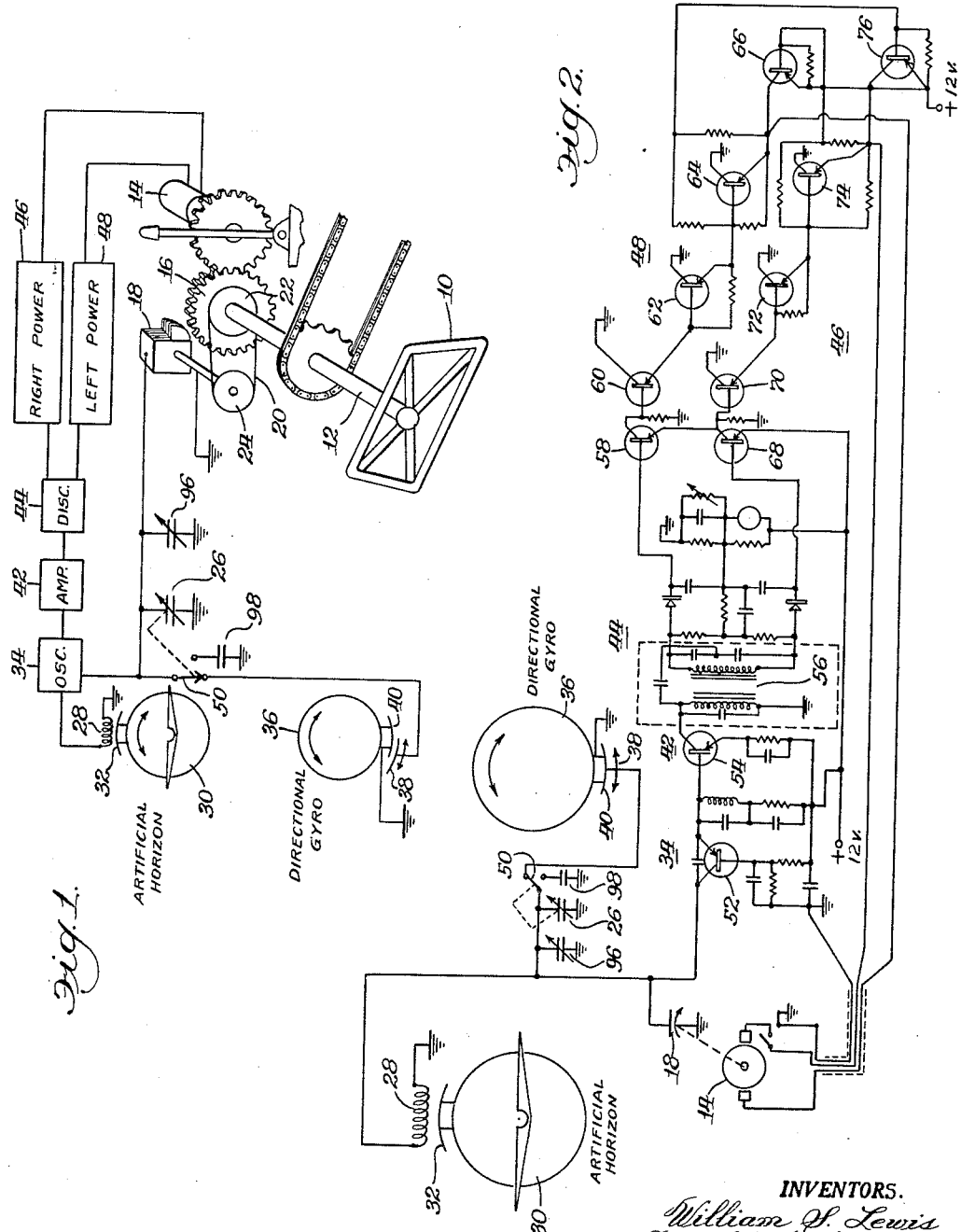

United States Patent Office 3,052,832
Patented Sept. 4, 1962

3,052,832
AUTOMATIC HEADING CONTROL SERVOSYSTEM
William S. Lewis, Dallas, and Donald H. Mitchell, Mineral Wells, Tex.; said Mitchell assignor to said Lewis
Filed Feb. 5, 1960, Ser. No. 6,958
11 Claims. (Cl. 318—489)

This invention relates to steering control apparatus and more particularly to automatic pilot equipment for aircraft which may be easily set to control the directional heading of an aircraft.

In the past, a wide variety of devices have been in use for automatically correcting directional flight of aircraft. These devices, however, have been complex, expensive to install, required relatively large power consumption, and added appreciably to the weight of the aircraft because of their size. The simple automatic steering devices which were available for small aircraft were not adjustable so that they would automatically follow a heading selected before the aircraft left the ground or during flight. In our prior Patent 2,853,671, issued September 23, 1958, steering control apparatus for aircraft was disclosed which eliminated many of the disadvantages found in other automatic aircraft orientation devices. The present invention is an improvement over the system of this patent.

Thus, it is an object of this invention to provide improved automatic directional heading apparatus for a mobile craft which is of relatively simple and inexpensive construction.

Another object of the invention is to provide automatic directional heading apparatus which may be set for a particular heading while the aircraft is on the ground or after it is in flight.

Still another object of the invention is to provide automatic directional heading apparatus which utilizes a modified directional gyro equipped with an adjustable reference azimuth chart.

A feature of the invention is the provision of aircraft directional heading apparatus which includes a directional gyro having capacitor rotor plates attached to a vertical controlled axis of the gyro and stator plates adjustably mounted for positioning at any directional heading reference point.

Another feature of the invention is the provision of automatic directional heading apparatus for aircraft which directly utilizes the standard aircraft source voltage for all electrical components of the heading apparatus.

Yet another feature of the invention is the provision of automatic directional heading apparatus in which a reference azimuth chart is maintained in close proximity to the directional gyro to aid in plotting the magnetic directional heading of a mobile craft, such as an aircraft, through manual setting of the reference azimuth chart, FIG. 1 is a functional block diagram of automatic directional heading apparatus for aircraft incorporating the invention;

FIG. 2 is a schematic diagram of the electronic circuit used in the invention;

FIG. 3 is a perspective view of a directional gyro modified in accordance with the invention;

FIG. 4 is a fragmentary perspective bottom view of the directional gyro showing capacitor plates mounted in accordance with the invention;

FIG. 5 is a bottom view of the gyro; and

FIG. 6 is a fragmentary plan view of FIG. 5.

In practicing the invention, automatic directional heading apparatus for a mobile craft such as an aircraft is provided which responds to indications from a directional gyro and artificial horizon. The apparatus utilizes a radio frequency signal provided by an oscillator circuit which is varied as the directional heading or the roll position of the aircraft changes. The oscillator circuit includes an air-dielectric, variable capacitor coupled to the directional gyro and to a reference azimuth chart, and a coil coupled to the artificial horizon. Changes in inductance produced by the artificial horizon and/or changes in capacitance produced by the directional gyro cause a change in the frequency of the control signal. The capacitor consists of semicircular rotor plates attached to a vertical controlled axis of the gyro and stator plates mounted for movement related to a selected directional heading of the aircraft. Whenever a particular heading is dialed on the azimuth chart, the stator plates are positioned so that deviations from the selected heading cause changes in capacitance which cause frequency variations that are converted to voltages for actuating electric motor servo control mechanism. By placing the stator plates in a fixed position, the automatic directional heading system is given a memory and any change in heading will change the capacitance to thereby add to or subtract from the reference frequency. The stator of the capacitor mounted on the gyro may rotate 360° about the vertical axis to permit the selection of any desired course or heading. The rotor plates of the capacitor are directly coupled to the vertical controlled axis of the gyro so that when the gyro is uncaged or floating the rotor plates are free to rotate 360° as the vertical axis rotates. Additional capacitance is coupled to the gyro to compensate for inherent inflight or off-balance conditions of the aircraft and for turning the aircraft through manual variation of capacitance.

Referring now to FIG. 1, there is shown a functional block diagram of automatic steering apparatus for aircraft incorporating the invention. The control wheel 10 is secured to steering shaft 12 so that rotation of the shaft moves the ailerons and/or rudder of the aircraft. The wheel 10 also may move toward and away from the pilot of the aircraft to provide upward and downward movement of the aircraft through suitable related control apparatus. To maintain the wings of the aircraft in a horizontal, level position about the roll axis or the axis which passes longitudinally through the fuselage and to maintain the aircraft in a desired directional heading, rotation of shaft 12 is all that is necessary in most modern aircraft.

Instrument 36 is a directional gyro normally provided in aircraft for indicating directional heading whereas the artificial horizon 30 indicates level flight. When a human pilot is controlling the aircraft he rotates wheel 10 in response to indications from artificial horizon 30 and directional gyro 36. In the invention, artificial horizon 30 is equipped with a variable inductance coil 28 and a movable plate 32 for varying the inductance of coil 28 according to the roll of the aircraft. The directional gyro is equipped with a variable capacitor consisting of plates 38 and 40. The capacitor of the directional gyro 36 and the inductor of artificial horizon 30 are connected to oscillator circuit 34 which produces a control signal of standard frequency for a given orientation of the aircraft. A follow-up capacitor 18, a turn-trim capacitor 96, and turn capacitor 26 also are connected to oscillator circuit 34 to vary the control signal frequency. A switch 50 substitutes fixed capacitor 98 for the capacitor in the directional gyro when turn capacitor 26 is used to turn the aircraft. Capacitor 26 cannot be varied in capacitance until switch 50 is actuated to connect capacitor 98 into the circuit.

The signal from oscillator circuit 34 is applied to amplifier circuit 42 and then to discriminator circuit 44. Discriminator circuit 44 actuates either right power transistor circuit 46 or left power transistor circuit 48 coupled to reversible motor 14. Motor 14 rotates in a clockwise or counter-clockwise direction depending upon which power transistor circuit is actuated and the steering shaft gear 16 will rotate in an opposite direction to the rotation of the motor. Follow-up capacitor 18 is coupled through cord 20 and pulley 24 to steering shaft pulley 22.

With the automatic control system in operation and the aircraft in flight, the following explanation of operation is given assuming that the heading of the aircraft is shifted to the right of the desired heading. As gyro 36 indicates a new heading to the right of the selected heading, capacitor plates 38 and 40 cause an increase in capacitance thus lowering the frequency of the signal produced by oscillator circuit 34. Discriminator circuit 44 actuates the left power transistor circuit 48 to apply operating potential to motor 14 causing the motor shaft to rotate in a clockwise direction and causing the steering shaft 12 to rotate in a counter-clockwise direction to raise the right wing and lower the left wing, thus putting the aircraft back on course. However, as shaft 12 rotates, the capacitance of follow-up capacitor 18 is lowered thus tending to raise the frequency of the signal produced by oscillator circuit 34. The motor will operate until the capacitance of follow-up capacitor 18 is reduced to compensate for the increased capacitance of plates 38 and 40 whereupon motor 14 will be de-energized. The initial change in oscillator frequency causes steering shaft 12 to be rotated so that follow-up capacitor 18 will nullify the initial change thereby returning the signal to the standard frequency.

Directional gyro 36 follows the changing orientation of the aircraft, decreasing the capacitance of capacitor plates 38 and 40 so that the motor will be energized to drive the steering shaft 12 in a clockwise direction and thus cause the follow-up capacitor 18 to increase in capacitance. When the aircraft is back on course capacitor 18, steering wheel 10, and the ailerons of the aircraft are in a normal or neutral condition as the aircraft is on the selected course heading.

The directional heading of the aircraft may be changed through manual manipulation of turn capacitor 26 after operating switch 50 to connect capacitor 98 into the circuit. Varying the capacitance of turn capacitor 26 causes the aircraft to change directional heading in the manner described previously for correcting an off-heading movement. Capacitor 96 is a turn-trim capacitor used to compensate for inherent variables of the aircraft such as loading.

FIG. 2 is a schematic diagram of the electronic circuit used in the invention. The circuit may be broken down into four basic components as indicated in the functional block diagram of FIG. 1. These four are the oscillator section 34, amplifier section 42, discriminator section 44, and right power section 46 or left power section 48. Transistor 52 and capacitors 26, 18, 38–40, 96, and inductor 28 form the variable frequency portion of the oscillator circuit. Transistor 54 serves as an amplifier and transformer 56 is part of the discriminator circuit. Heading the aircraft to the right or left is achieved through transistor switching circuits operable from voltages from the discriminator circuit of transformer 56. Transistors 58 and 60 are voltage amplifiers in the left power circuit and transistors 62, 64, and 76 are power transistors. Transistors 68 and 70 are voltage amplifiers in the right power circuit and transistors 72, 74 and 66 are power transistors. Each power circuit causes rotation of the servo motor but in opposite directions. When the right wing is lowered and left power is required to put the aircraft back on the desired heading, transistor 76 energizes motor 14 through transistor 64 ground return. Transistors 66 and 76 are the switched transistors and transistors 64 and 74 are switching transistors for a ground return from the motor. Transistor 74 is the ground return for right power and transistor 64 is the ground return for left power.

FIG. 3 is a perspective view of a directional gyro 36 which has been modified in accordance with the invention. The face 78 of the gyro has been modified to include a 360° azimuth dial 80 which is rotatable by knob 84 through gears 114 and 116 to a desired heading which may be assumed to be 150°. The 150° setting is shown at the top of dial 80. The azimuth dial is coupled to a mounting in the bottom part of the gyro having stator plates of an air dielectric variable capacitor. Knob 100 uncages the gyro and allows free movement of dial 82. The reading of dial 82 should correspond to the setting of dial 80 when the aircraft is being kept on correct heading through automatic control. Knob 86 is pulled out to actuate switch 50 and rotate shaft 104 thereby varying the capacitance of turn capacitor 26 to turn the aircraft. Turn-trim knob 102 is used to vary turn-trim capacitor 96.

FIG. 4 is a bottom view of the directional gyro showing rotor plates 40 and stator plates 38 mounted in accordance with the invention. Chain coupling 88 is used to correlate rotation of the azimuth dial with rotation of circular mounting 90 on which stator plates 38 are mounted. Rotor plates 40 are mounted on vertical axis 92 of the gyro for 360° rotation. Thus, for a desired heading of 150° the azimuth dial is set to 150°. Stator plates are thereby referenced in a particular position so that as the aircraft deviates from a 150° course, variable capacitance will be created by capacitor plates 38 and 40.

FIG. 5 is a bottom view of the gyro. Chain 88 is continuous and moves mounting 90 on which stator plates 38 are mounted. Rotor plates 40 are coupled to axis 92 and rotate with the axis whenever the gyro is uncaged. Shaft 104 is moved laterally to actuate contact 108 of switch 50 through spring 106. When gear 110 rotates gear 112, turn capacitor 26 is varied in capacitance to effect turning of the aircraft. Capacitor 26 cannot be varied in capacitance until switch 50 has been actuated to substitute capacitor 98 for the capacitance developed between plates 38 and 40.

FIG. 6 is a fragmentary plan view of FIG. 5. Chain 88 causes rotation of mounting 90 which holds stator plates 38 to give a reference directional heading. If directional heading is inadvertently varied, axis 92 rotates and rotor plates 40 move causing capacitance between plates 40 and 38 to change.

Thus, the invention provides for an improved mobile craft orientation correction system incorporating a modified conventional directional gyro equipped with an air-dielectric variable capacitor. A particular heading may be chosen while the mobile craft is on the ground or, as in the case of an aircraft, after it is airborne. The stator plates of this variable capacitor are attached to a circular mounting coupled to an azimuth dial in proximity to the heading indicator of a directional gyro. A directional heading is chosen on the azimuth dial coupled to the variable capacitor and when the craft is on course, the directional gyro reading corresponds to the azimuth dial reading. Stator plates of the capacitor are rotatable and may be fixed at a reference point. The system, therefore, provides a simple and inexpensive method of maintaining a mobile craft on a selected directional heading. Modifications to the gyro normally found as standard equipment in an aircraft are kept to a minimum.

We claim:

1. Automatic control apparatus for an aircraft having a steering column adapted for rotation to control the aircraft, a level indicator for the aircraft including a movable portion, and a direction indicator for the aircraft including a movable portion, said apparatus including in combination, reversible electric motor means, means coupling said motor means to the steering column, a wave signal oscillator including first, second, and third variable frequency controlling portions for increasing and decreasing the frequency of a control signal normally of reference frequency produced by the oscillator, means connecting said first frequency controlling portion to the steering column for varying the same with rotation thereof, means connecting said second frequency controlling portion to said movable portion of the level indicator for changing the frequency of said oscillator in response to change in level conditions of the aircraft, said third frequency controlling portion being a capacitor having first and second movable portions, means connecting said first portion of said capacitor to the movable portion of the direction indicator, and adjustable means for supporting said second portion of said capacitor, whereby said capacitor changes the frequency of said oscillator in response to relative movement of said first and second movable portions thereof upon changes in direction of the aircraft relative to a predetermined setting of said adjustable supporting means, discriminator and control means coupled to said oscillator and to said motor means for energizing the same to rotate the steering column in respective directions determined by increase and decrease in said control signal frequency, the changes in frequency of said control signal with respective changes in level condition and direction heading of the aircraft being correlated to cause the steering column to be driven by said motor to maintain a selected level and heading orientation of the aircraft.

2. Automatic directional heading control apparatus for a mobile craft having steering means adapted to control the directional heading of the craft, said control apparatus including in combination, control means coupled to the steering means to move the same, oscillator means including variable reactance means for producing a control signal of standard frequency associated with a given directional heading of the mobile craft, directional heading indicating means including capacitor means coupled to said oscillator reactance means and having a first portion movable with a change in the directional heading of the mobile craft and a second portion manually movable for referencing to a selected directional heading, said capacitor effecting changes in the signal frequency, frequency responsive means coupled to said oscillator means and to said control means for energizing the latter according to the frequency of the control signal as varied by said reactance means thereby positioning the steering means in accordance with the relative positions of said first and said portions of said directional heading capacitor means, and follow-up capacitor means coupled to said oscillator means to vary the frequency of the signal produced thereby, said follow-up capacitor means being variable with movement of the steering means to vary the frequency of the control signal toward said standard frequency when the steering means is moved.

3. Automatic directional heading control apparatus for aircraft having a steering column adapted to control the directional heading of the aircraft, said control apparatus including in combination, reversible electric motor means, means coupling said motor means to the steering column, a wave signal oscillator including a frequency controlling portion for increasing and decreasing the frequency of a control signal normally of reference frequency produced by the oscillator, the signal of reference frequency being associated with a selected heading of the aircraft, a directional gyro heading indicator for the aircraft, capacitor means having first and second movable plate means connected in the frequency controlling portion of said oscillator for changing the frequency of said oscillator in response to changes in direction of the aircraft, said first movable plate means being mounted on a vertical axis of said directional heading indicator and rotatable through 360° about the axis as the heading of the aircraft changes, said second movable plate means being mounted on the heading indicator and manually rotatable with respect to the vertical axis thereof to set the position thereof to correspond to a desired azimuth heading of the aircraft, variations from the desired heading causing displacement of the said first plate means with respect to said setting of said second plate means to vary the capacitance of said capacitor means thereby changing the frequency of said control signal, discriminator and control means coupled to said oscillator and to said motor means for energizing the same to turn the steering column in respective directions determined by increase and decrease in the frequency of said control signal, the changes in frequency of said control signal with respective directional heading changes of the aircraft causing the steering column to be driven by said motor means to maintain the fixed directional heading of the aircraft.

4. A directional heading indicator for a mobile craft including in combination, a first controlled portion rotatable about an axis, said first controlled portion indicating azimuth direction, rotor capacitor plates carried by and movable with said first portion, a second mounting portion rotatable about said axis, a reference azimuth chart coupled to said second mounting portion for rotating the same, and stator capacitor plates cooperating with said rotor capacitor plates and supported on said second portion, whereby said stator plates are fixed for a particular directional heading, said first portion rotating upon variation in directional heading thereby causing rotation of said rotor plates with respect to said stator plates to vary the capacitance between said rotor and stator plates.

5. A directional gyro including a housing, a direction indicator rotatable about a vertical axis, variable capacitor means having rotor and stator plates, a reference azimuth chart mounted for movement adjacent said housing, and means coupling said reference chart to said stator plates, said rotor plates being coupled to said rotatable indicator and rotatable through 360° about said vertical axis, said stator plates being mounted concentric with said axis and rotatable through 360° thereabout as a directional heading is selected through movement of said reference azimuth chart, rotation of said rotor plates as said direction indicator varies from the heading selected on said reference azimuth chart changing the position thereof with respect to said stator plates and causing said capacitor means to vary in capacitance.

6. A directional heading indicator for an aircraft including in combination, first and second variable capacitors, means coupled to said capacitors for independently varying the same, a third variable capacitor having movable rotor and stator plates, a fourth capacitor having fixed capacitance, switching means coupled to said third and fourth capacitors to select one of the same for operation, a controlled portion rotatable about an axis, said controlled portion indicating azimuth direction and coupled to said rotor capacitor plates to move the same, a rotatable mounting supporting said stator plates, a reference azimuth chart coupled to said rotatable mounting for rotating the same, whereby said stator plates are held in a selected position for a particular directional heading, said controlled portion moving upon variation in directional heading thereby causing rotation of said rotor plates with respect to said stator plates to vary the capacitance between said stator and rotor plates.

7. A directional heading indicator for aircraft including in combination, control circuit means, a first controlled portion rotatable about an axis according to variations in the heading of the aircraft, a first variable capacitor having movable rotor and stator plates, said rotor plates being attached to said controlled portion for rotation therewith about said axis, a second mounting portion rotatable about said axis and supporting said stator plates thereon, an azimuth direction chart coupled to said second mounting portion and moving said stator plates to a particular heading dialed on said chart, second and third variable capacitors connected to said control circuit means and having rotary control portions, shaft means including inner and outer rotatable shafts coupled to said control portions of said second and third capacitors respectively for independent variation thereof, a fourth fixed capacitor, a switch coupled to said outer shaft and actuated by axial movement thereof, said switch selectively connecting said first and fourth capacitors to said control circuit means, said outer shaft being free for axial movement to actuate said switch to connect said first capacitor to said control circuit means only when in a particular rotary position so that said third capacitor has a fixed value when said first capacitor is connected to said control circuit means.

8. Automatic control apparatus for a mobile craft having a steering means adapted for movement to control the craft, a level indicator for the craft including a movable portion, and a directional indicator for the craft including a movable portion, said apparatus including in combination, reversible electric motor means, means coupling said motor means to said steering means, a wave signal oscillator circuit including first, second, and third variable frequency controlling portions for increasing and decreasing the frequency of a control signal normally of reference frequency produced by said oscillator circuit, means connecting said first frequency controlling portion to said steering means for varying the same with movement thereof, means connecting said second frequency controlling portion to said movable portion of the level indicator for changing the frequency of said oscillator circuit in response to change in level conditions of the craft, said third frequency controlling portion including a first variable capacitor coupled to said oscillator circuit, a second variable capacitor coupled to said directional indicator whereby capacitance is varied with directional changes of the craft, a third capacitor having fixed capacitance, and switch means selectively connecting said second and third capacitors to said oscillator circuit, said first capacitor changing the frequency of said oscillator circuit in response to manual changes of capacitance when said third capacitor is connected to said oscillator circuit, said second capacitor changing the frequency of said oscillator circuit in response to variations from a selected directional heading when said first capacitor is fixed at a predetermined capacitance and connected to said oscillator circuit, discriminator and control means coupled to said oscillator and to said motor means for energizing the same to move the steering means in respective directions determined by increase and decrease in said control signal frequency, the changes in frequency of said control signal with respective changes in level condition and directional heading of the mobile craft being correlated to cause the steering means to be positioned by said motor to maintain a selective level and directional heading orientation of the mobile craft.

9. A directional heading indicator for aircraft including in combination, control circuit means, a first controlled portion rotatable about an axis according to variations in magnetic heading, a first variable capacitor having movable rotor and stator plates, said rotor plates being attached to said controlled portion for rotation therewith about said axis, a second mounting portion rotatable about said axis and supporting said stator plates thereon, an azimuth direction chart coupled to said second mounting portion and moving said stator plates to a particular heading dialed on said chart, a second variable capacitor connected to said control circuit means and having a rotary control portion, shaft means coupled to said control portion of said second capacitor for variation thereof, a third fixed capacitor, a switch coupled to said shaft and actuated by axial movement thereof said switch selectively connecting said first and third capacitors to said control circuit means, said shaft being free for axial movement to actuate said switch to connect said first capacitor to said control circuit means only when in a particular rotary position so that said second capacitor has a fixed value when said first capacitor is connected to said control circuit means.

10. A directional heading indicator for aircraft including in combination, control circuit means, a first controlled portion rotatable about an axis according to variations in magnetic heading, a first variable capacitor having movable rotor and stator plates, said rotor plates being attached to said controlled portion for rotation therewith about said axis, a second mounting portion rotatable about said axis and supporting said stator plates thereon, an azimuth direction chart coupled to said second mounting portion and moving said stator plates to a particular heading dialed on said chart, a second variable capacitor connected to said control circuit means, means coupled to said second capacitor for varying the capacitance thereof, a third capacitor having fixed capacitance, a switch coupled between said first and third capacitors for selectively connecting said first and third capacitors to said control circuit means, said switch being operable only when the capacitance of said second capacitor is at a particular capacitance when said first capacitor is connected to said control circuit means.

11. Automatic control apparatus for a mobile craft having steering means adapted for movement to control the craft, and a directional indicator for the craft including a movable portion, said apparatus including in combination, control means coupled to the steering means, an electronic oscillatory circuit including a frequency controlling portion for increasing and decreasing the frequency of a control signal normally of reference frequency produced by said circuit, a first variable capacitor having movable rotor and stator plates, said rotor plates being attached to the movable portion of the indicator for rotation therewith about an axis, a mounting portion rotatable about said axis and supporting said stator plates thereon, an azimuth direction chart coupled to said second mounting portion and including dial means for moving said second mounting portion and said stator plates thereon to a particular heading, second and third variable capacitors connected to said frequency controlling portion and having rotary control portions, shaft means including inner and outer rotatable shafts coupled to said control portions of second and third capacitors respectively for independent variation thereof, a fourth fixed capacitor, a switch coupled to said outer shaft and actuated by axial movement thereof, said switch selectively connecting said first and fourth capacitors to said frequency controlling portion, said outer shaft being free for axial movement to actuate said switch to connect said first capacitor to said frequency controlling portion only when in a particular rotary position so that said third capacitor has a fixed value when said first capacitor is connected to said frequency controlling portion.

References Cited in the file of this patent

UNITED STATES PATENTS

| | | |
|---|---|---|
| 2,126,910 | Moseley | Aug. 16, 1938 |
| 2,467,335 | Rath | Apr. 12, 1949 |
| 2,606,310 | Baker | Aug. 5, 1952 |
| 2,644,243 | Breeze et al. | July 7, 1953 |
| 2,751,539 | Anderson et al. | June 19, 1956 |
| 2,853,671 | Lewis et al. | Sept. 23, 1958 |
| 2,925,590 | Boltinghouse et al. | Feb. 16, 1960 |